Figure 1:
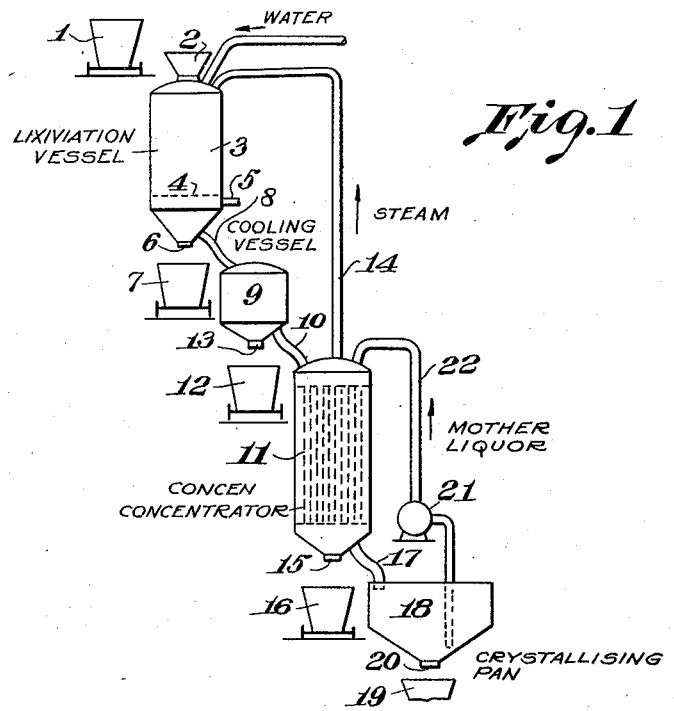

July 7, 1931.  E. JÄNECKE ET AL  1,813,575

TREATMENT OF CRUDE MINERAL SALTS

Filed Dec. 20, 1927

Inventors
Ernst Jänecke
Hermann Klippel
Emil Hegelmann

By Hauff & Marland
Attorneys

Patented July 7, 1931

1,813,575

UNITED STATES PATENT OFFICE

ERNST JÄNECKE, OF HEIDELBERG, HERMANN KLIPPEL, OF LUDWIGSHAFEN-ON-THE-RHINE, AND EMIL HEGELMANN, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

TREATMENT OF CRUDE MINERAL SALTS

Application filed December 20, 1927, Serial No. 241,347, and in Germany December 14, 1926.

The present invention relates to the treatment of crude mineral salts by lixiviation with water or aqueous solvents, and is more particularly intended to the treatment of crude nitrate earth, so-called caliche. We do not wish, however, to limit our invention to the treatment of crude earths, but also wish to include the treatment of crude potassium salts, for example the treatment of carnallite for the purpose of recovering potassium chlorid therefrom. Accordingly the term "crude mineral salts" whenever used in this specification and in the appended claims, is intended to mean crude nitrate earths and crude potassium salts.

According to the methods hitherto known, it has been a matter of great difficulty to work up crude mineral salts, especially when the said minerals are low in the valuable salt, or contain large amounts of ballast soluble in water. For instance, it was hitherto practically impossible to recover in an economical manner the small amounts of sodium nitrate contained in crude nitrate earths, low in nitrate, or in the residues still containing the said salt, by means of the usual method of lixiviation with water in the heat, since the lixiviation of these materials required too long a period of time and the complete washing out of the sodium nitrate contained therein is practically impossible owing to the large amounts of valueless ballast contained in the raw material. For the said reasons the lixiviation with water is extremely tedious and expensive.

By our present invention we claim to have overcome the said difficulties and to have made available a process which can simply and cheaply be carried out in practice. We shall now proceed to explain our invention, mostly referring to the treatment of crude nitrate earths, it being understood that our invention can be applied in a similar manner to the treatment of potassium salts. In so describing our invention, we shall refer to the accompanying drawings forming part of this specification.

We have found that the treatment of crude mineral salts is effected in a surprisingly simple manner by employing steam as a lixiviating agent. Because steam, being in a vaporous condition, penetrates into the fine pores of the material far more rapidly, than water or other liquids, the process can thus be carried out far more rapidly than with liquids. The employment of steam has the further great advantage that, because of the rapidity of the passage of the same, practically only those salts which are very easily and rapidly soluble, go into solution, while those which are less soluble remain in the residue. A most efficacious separation of the various salts is thus obtained.

For instance, in the case of crude nitrate earths, low in sodium nitrate, practically the whole of the sodium nitrate can be recovered rapidly and in a simple manner, if the materials to be treated are acted upon with steam instead of a lixiviating liquid as hitherto usual. The steam is condensed when acting on the material, and the sodium nitrate is washed out by the action of the condensate. The steam is passed through the material to be worked up from above, because the condensate then has better opportunities for dissolving the sodium nitrate, and for being enriched therein. The duration of the action of steam on the material should preferably be as short as possible, this having the great advantage, that mainly sodium nitrate, being the most rapidly soluble constituent, is dissolved from the mass. In order to accelerate the lixiviation process, and to economize with the steam, the mass may previously be moistened with water or a dilute solution of sodium nitrate. The dissolution of the soluble constituents of the crude sodium nitrate still continues, even after the mass has attained the temperature of the steam, since the brines, which are formed, have a lower vapor tension than steam at the same temperature, whereby such brines are especially easily produced, which have a particularly low vapor pressure, as is the case with concentrated sodium nitrate solutions. The steam easily passes through the mass, without the same becoming clogged. No clogging takes place even when powdered caliche containing 20 per cent of fine powder, and the grains of which are less than 0.5 millimetre in diameter, is employed. Sodium nitrate separates from the hot brines thus obtained directly in the pure state. The mother liquor obtained therefrom which contains a certain amount of sodium chlorid, sodium sulfate and other salts in addition to sodium nitrate, is conducted into a concentrator. The steam produced therein is preferably used for the treatment of fresh nitrate earths. If only small amounts of sodium nitrate separate out at first the brines obtained may be introduced directly into the concentrator without being first cooled. The salts which are difficultly soluble in the heat, such as sodium sulfate and sodium chlorid crystallize out during the concentration, which preferably takes place in a tube boiler, and these salts are separated from the hot brine. The latter runs into a crystallizing pan, in which sodium nitrate again separates out on cooling. The cold mother liquor is again introduced into the concentrator. It is advantageous to employ part of the mother liquor for moistening the caliche, which is to be treated. In order to pass the steam through the mass to be lixiviated more rapidly, it is also advantageous to employ reduced pressure and to remove the brines by suction, in which case the concentration may also be carried out advantageously under reduced pressure. Care should however be taken, that the steam does not pass through the material too rapidly, as otherwise it would condense only insufficiently, since the condensation then takes place later, whereby the brines become diluted.

After the steam has been passed through and the mass lixiviated, a stream of air or other gas may be blown through the hot residues, from which the sodium nitrate has been extracted, by means of which gas the heat contained therein is partly recovered, if the hot air or other gas is employed for preheating the mother liquors, which have been cooled to promote crystallization, or for any other suitable purpose. The heat contained in the hot brines, coming from the condenser, may also be partly recovered by suitable arrangements, for instance, by working according to the counter-current system. A plant, which is suitable for carrying out the process, according to our invention is diagrammatically shown by way of example in Figure 1 of the accompanying drawings.

Crude nitrate earth is brought up by means of a trolley 1 and introduced through a funnel 2 into a lixiviating vessel 3. A sieve 4 is arranged in the lower part of the said vessel on which the material rests. A suction pipe 5 is affixed below the sieve 4. The lixiviated crude mass may be emptied through an aperture 6 which can be closed by a lid into a trolley 7 and taken away. The brine flows through a pipe 8 to a collector 9, in which it is allowed to cool, whereupon sodium nitrate crystallizes out. The mother liquor therefrom is passed through a pipe 10 into a concentrator 11. The sodium nitrate which is produced in the collector 9 may be emptied into a trolley 12 through an opening 13. The concentrator 11 is advantageously arranged as a tube boiler. The steam produced therein is passed through a pipe 14 to the vessel 3 and thus utilized for the lixiviation. The solid salt produced in the concentrator may be emptied through an opening 15 into a trolley 16 and taken away therein. The hot mother liquor flows through a pipe 17 into a crystallizing pan 18. The salt which separates out therein may be emptied into a trolley 19 through an aperture 20. A pump 21 forces the cooled mother liquor back into the concentrator 11 through a pipe 22. Several of these plants may be employed working together, according to the amount of material to be treated. The size and number of the separate vessels depend on the amount of material to be treated, and the volume of the brines obtained.

The process may be carried out in the most various ways. For example, the treatment with steam may be carried out by introducing water, which has already been heated and has a temperature of more than 100° C. into the lixiviating vessel, the water on its entry into the vessel being, owing to the release of pressure, partly converted into steam, which acts on the materials to be extracted in the beforedescribed manner.

The aforedescribed process may also be carried out continuously for example by working with the aid of a worm conveyor feeding the material to be lixiviated through a long tube through which the steam is passed in a counter-current. But in this manner of working the residues obtained are usually moist and may contain more than 10 per cent of moisture. This disadvantage which is particularly disagreeable in the case of potassium salts, may be overcome by drying the lixiviated mass before it leaves the apparatus. This is most suitably effected by heating the casing of the lixiviating vessel containing the worm-conveyor or the like externally, particularly in the neighbourhood of the point, where the lixiviated mass emerges. The heating may be carried out in various ways, and is preferably effected with the aid of steam or hot gases. The moisture contained in the residue is converted by the heating process into steam, which is again employed for lixiviating or in any other manner desired. It is of importance, in order to facilitate the evaporation, that the vapor tension within the casing of the worm conveyor by small. The steam, which is intended for lixiviating should be introduced not too far from the point, where the mass is filled in, besides which the worm conveyor should have a suitable length and an adequate speed of working.

In this manner of working the lixiviation may also be effected, instead of with steam, with water or aqueous solutions, which if desired may be warm. Also by this means a good effect is produced, in accordance with the high rate of solution of sodium nitrate, or for example carnallite.

Figure 2:
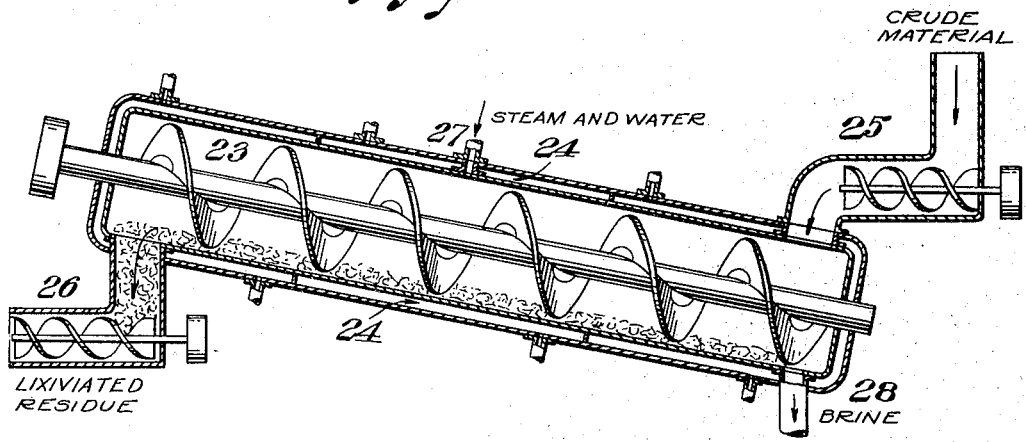

An apparatus, suitable for carrying out this manner of working is diagrammatically shown by way of example in Figure 2 of the accompanying drawings.

A worm conveyor 23, which is inclined towards the point of ejection for the brines, is surrounded with a heatable mantle 24. The mantle is divided into several smaller compartments, each of which can be heated separately with steam or hot gases, by which means the heating of each separate part of the casing may be regulated. The heated crude material is introduced by means of a smaller worm conveyor 25 and the lixiviated residue removed by a conveyor 26. The steam or the water necessary for the lixiviation is introduced by a pipe 27. The effluent solution is withdrawn by a pipe 28. If water is employed for lixiviating, it is best to introduce the same by means of a rose or other dispersing devices.

The process according to our present invention may also be carried out advantageously by spraying water onto the crude mineral salts, which have been heated to a temperature higher than 100° C. and preferably even higher than 120° C. The amount of steam necessary for lixiviation is thus directly produced. It is advantageous to employ the mother liquors from a previous charge for spraying onto the material, in place of water. It is of particular advantage in this case, that the other salts, which accompany the sodium nitrate are present in a far smaller amount than, for instance, in the mother liquors obtained according to other methods of working, according to which, for instance, caliche is treated for a considerable length of time with water or weak brines.

This manner of working has the great advantage that the brines are concentrated by the evaporation of water during the lixiviation process. Since the residue retains moisture, it is desirable that the same should not contain too much sodium nitrate. For this reason it is advisable after spraying with mother liquor and thus extracting the bulk of the sodium nitrate to spray further with a certain amount of warm water, which pushes the concentrated brines forward in the apparatus. The process is preferably conducted in such a manner, that the steam produced has only a small surplus pressure of a few millimetres of mercury and only presses the brines out of the apparatus in so far as they are concentrated, and that just that amount of sodium nitrate separates out on cooling, as has been newly taken up by the solution. When working with a worm conveyor, this may be achieved by regulating the rates of rotation of the conveyor and the amount of mother liquor or brine sprayed into the apparatus.

It is very advantageous to heat the apparatus in such a manner, that oil, heated for example to 120° C., is passed through a heating mantle. This method of heating has the further advantage that the heat is better utilized, than for instance in the case of the employment of superheated steam or of electrical heating devices, since the oil, which is pumped through the heating mantle, can be taken from a boiler which is heated directly. It has also been found that in all the above manners of working, the steam by means of which the brines are pressed out of the apparatus, may be replaced, either wholly or in part, by compressed air. Compressed air may be especially employed towards the end of the lixiviation.

The lixiviation can be carried out in a continuous process in a particularly advantageous manner when working with a system of containers filled with the mass to be lixiviated, steam or water being supplied to one of the containers and the resulting brines being passed through the following containers, one after the other. Always that container in which the material is sufficiently lixiviated, is shut off from the flow of liquid, emptied, charged with fresh crude mineral salt and again connected to the flow as the last of the series. From such last container a hot saturated solution of sodium nitrate is withdrawn which contains only small quantities of other soluble constituents of the crude mineral salt and from which pure sodium nitrate is separated on cooling. The brines of the other containers contain less sodium nitrate, but some times more other soluble salts such as common salt and sodium sulphate. These salts are deposited in the solid state when the liquid passes through the following containers and remain in the residues. The steam required for lixiviation may, as pointed out hereinbefore, be supplied to the containers from above or produced by spraying water onto the crude mineral salt heated to above 100° C. and more suitably to above 120° C., or by spraying water onto the crude salt and externally heating the containers. Preferably the crude mineral salt to be treated is continuously preheated for example in a revolving drum. In this operation it is possible, by suitably controlling the temperature, to recover the iodine, contained in the crude caliche, in the elementary state and without decomposition of the nitrate. The fresh crude mineral salt supplied to a container is preferably moistened with a warm brine, saturated in the cold, from a previous operation; by this means the amount of circulating liquid is not increased and all of the nitrate is recovered in the solid state.

A procedure similar to that hereinbefore-described with reference to the treatment of crude saltpetre earth is adopted for the treatment of crude potassium salts, in particular of carnallite.

The usual methods of treating crude carnallite for the production of potassium chlorid have the great disadvantage that because all the carnallite is completely dissolved, the large amount of magnesium chlorid contained therein must be carried through the whole process, until ultimately the end brine rich in magnesium flows off. Similar brines are obtained in the treatment of artificial carnallite. According to the present invention, however, the greater part of the magnesium chlorid can be removed in a short time in a most simple manner. The carnallite $KCl.Mg Cl_2.6H_2O$ is split up by the action of the steam, whereby magnesium chlorid passes into solution, whereas the main portion of the potassium chlorid remains in the residue. The steam is preferably passed through the material from above and the process made continuous by means of a worm conveyor. Part of the potassium chlorid goes into solution by treatment with steam. But the smaller the amount of water is, which is produced by the condensation of steam, the smaller will be the amount of potassium chlorid which goes into solution. The temperature of the material to be treated may rise to considerably above that of the steam. Thus when the steam has a temperature of 100° C., the temperature of the moist material may rise to 135° C. or even more. This is due to the fact that solutions with a large content of magnesium chlorid boil at atmospheric pressure only at higher temperatures. Carnallite crystallizes out from the hot brines. After the greater part of the magnesium chlorid contained in the crude salt has been removed, a mixture rich in potassium chlorid remains, which can be either at once employed as high grade sylvinite or as so called "hard salt", that is salt containing from 12 to 23 per cent of sylvinite, from 35 to 70 per cent of rock salt and from 10 to 48 per cent of kierserite together with strongly varying amounts of langbeinite, schoenite, kainite and carnallite, or the residue rich in potassium chlorid may be worked up further for the production of potassium chlorid, either according to the methods usual for the treatment of such salts, or it may be still further lixiviated by renewed treatment with steam, preferably accompanied by the simultaneous injection of warm water in the form of spray. Brines are thus obtained, from which potassium chlorid at once separates out on cooling. The high temperature and the ready and rapid solubility of the fine potassium chlorid obtained from the carnallite, are particularly advantageous. If the residues containing potassium chlorid are to be further lixiviated, it is advisable to do this immediately after the lixiviation of the crude mineral salt, in order to utilize the heat contained therein. Thus, by working in stages, brines are obtained consecutively by the treatment with steam, from the first of which carnallite, and from the following potassium chlorid at once separates out. When working continuously with worm conveyors or similar contrivances, brines may be obtained at different points of the apparatus. The brines obtained on cooling may be again employed in the same process in place of water, in the form of a spray. The amount of steam consumed is small, and may be further decreased by externally heating the apparatus and by employment of dilute brines or water. Artificial carnallite can also be treated with steam in the same manner, a residue with a high content in potassium chlorid being thus obtained.

The following examples will further illustrate how the above process may be carried out in practice, although it is understood that the invention is not limited thereto. The parts are by weight.

*Example 1*

Steam alone is passed from above through one metric ton of caliche containing about 12.6 per cent of sodium nitrate resting on sieves, which is heated to about 100° C., for 10 minutes and then alternately therewith, at intervals of 10 minutes respectively, steam together with 10 litres of water is passed through the charge in the same manner. After 75 minutes 100 litres of hot brine have run off, from which already at 90° C. sodium nitrate separates out.

From the brine obtained altogether, 34 kilograms of sodium nitrate separate out, equivalent to 27 per cent of the total amount of sodium nitrate originally contained in the caliche. The rest of the sodium nitrate is for the greater part contained in the brine, whilst a small portion remains in the residue. The sodium nitrate contained in the brine is recovered by evaporation and crystallization according to the known methods.

*Example 2*

1 metric ton of caliche containing about 11.5 per cent of sodium nitrate, 16 per cent of sodium chlorid, 23 per cent of sodium sulfate, 5 per cent of magnesium chlorid and 41 per cent of insoluble substances is moistened from above with 50 litres of water, and steam is then passed through the charge from above, whereupon the mass is subjected to suction. 420 kilograms (300 litres) of warm brine are thus obtained containing 96 kilograms of sodium nitrate, that is to say 84 per cent of the sodium nitrate originally contained in the initial substance. The brine is worked up in the usual manner for the recovery of sodium nitrate. The amount of water contained in the brine is about 270 kilograms, and that in the residue about 135 kilograms, roughly about 400 kilograms in both together, 350 kilograms of which have been introduced as steam. The greater part thereof is again introduced into the process to act on a fresh charge. The weight of the moist residue of lixiviated crude sodium nitrate amounts to 880 kilograms and the said residue contains 15.5 per cent of water and 2.3 per cent of sodium nitrate.

*Example 3*

Steam is passed from above through 1 metric ton of caliche, containing about 12.5 per cent of sodium nitrate. The mass is thereby heated in the course of half an hour to 120° C. After 50 litres of brine have thus been obtained, 50 litres of water are introduced together with the steam, and then when altogether 120 litres, 140 litres and 170 litres of brine have been obtained, further amounts of 12.5 litres of water are introduced in each case. Roughly 450 kilograms (about 325 litres) of brine are collected. The 224 kilograms (160 litres) of this brine, which were first obtained, have a content of 80 kilograms of sodium nitrate, 11.3 kilograms of which separate out in the form of solid salt on cooling. The rest of the brine obtained (218 kilograms=165 litres) still contains 37 kilograms of sodium nitrate, and 6.2 kilograms of sodium chlorid separate out from the solution. 8 kilograms of sodium nitrate are still contained in the residue. Thus in all 93.5 per cent of the total amount of sodium nitrate originally contained in the initial material are lixiviated.

The brines contain about 280 kilograms of water. 140 kilograms of water are further contained in the residue, that is 420 kilograms in all. 37½ kilograms of this amount are introduced as liquid water, and the rest as steam.

*Example 4*

Steam is passed from above through 1 metric ton of crude sodium nitrate containing 12.5 per cent of sodium nitrate, 23 per cent of sodium sulfate, 15 per cent of sodium chlorid and 5.5 per cent of magnesium chlorid, resting on a heated sieve, for ten minutes. At intervals of ten minutes, 10 litres of water respectively are introduced together with the steam, altogether 90 litres, the total duration of the blowing in of steam amounts to two hours, and less than 300 kilograms of the same are introduced. 150 kilograms of hot brine are first obtained from which 40 kilograms of solid sodium nitrate separate out on cooling to 20° C. The brine further obtained yields 12.0 kilograms of solid sodium chlorid on cooling, and has a weight of 250 kilograms. After the separation of sodium nitrate, the brine first obtained still has a content of 32 per cent by weight of sodium nitrate, 12 per cent of sodium chlorid and 3 per cent of sodium sulfate. The second brine contains 21 per cent of sodium nitrate, 15 per cent of sodium chlorid and 5 per cent of sodium sulfate. Practically the whole of the sodium nitrate, about half of the sodium chlorid and only 7 per cent of the sodium sulfate contained in the crude sodium nitrate are thus dissolved. The brines thus obtained are worked up according to the known methods, for the recovery of the rest of the sodium nitrate contained therein.

*Example 5*

Dry steam is passed from above through 1 ton of sylvinitic carnallite roughly consisting of 68 per cent of carnallite, 13.5 per cent of sylvinite, 16 per cent of rock salt and 2 per cent of pieserite, and which therefore contains altogether 32 per cent of potassium chlorid. 100 kilograms of steam are used in the course of two hours, 545 kilograms of hot brine being thus obtained, from which 135 kilograms of pure carnallite separate out. The mother liquor contains about 300 kilograms of magnesium chlorid ($MgCl_2.6H_2O$) and less than about 1.5 per cent by weight of potassium chlorid. The residue amounts to 555 kilograms and contains 250 kilograms of sylvinite, 125 kilograms of carnallite, and practically the whole of the rock salt (160 kilograms) originally contained therein, together with 20 kilograms of kieserite. The total amount of potassium chlorid contained therein is therefore 283 kilograms. Thus the residue now consists of a sylvinite, still containing a certain amount of carnallite, and having a total content of 51 per cent of potassium chlorid. It contains 88 per cent of the potassium chlorid originally contained in the initial substance, 78 per cent of which are derived from the sylvinite and 10 per cent from the carnallite. 10.8 per cent of the potassium chlorid originally contained in the initial substance are contained in the carnallite which separates out, whilst only 1.2 per cent of the said potassium chlorid are contained in the mother liquor therefrom. Thus 420 kilograms of the 680 kilograms of the pure carnallite originally contained in the crude carnallite, are converted, while solid sylvinite separates out, 135 kilograms of the said pure carnallite have been dissolved in the brine produced, which again separate out on cooling, whilst 125 kilograms remain in the residue unchanged. If the 555 kilograms of the residue are further treated with moist steam (50 kilograms of water with 75 kilograms of steam), 280 kilograms of hot brine are obtained, from which 40 kilograms of a mixture of carnallite and potassium chlorid separate out on cooling. The mother liquor therefrom amounting to 240 kilograms contains mainly magnesium chlorid, and in addition thereto 20 kilograms (8.3 per cent) of potassium chlorid. The residue amounts to 400 kilograms and contains 225 kilograms of sylvinite and 30 kilograms of carnallite, and further 125 kilograms of rock salt and 20 kilograms of kieserite. This comprises a sylvinite, containing minor amounts of carnallite and kieserite and with a content of 61 per cent of potassium chlorid. It thus contains 74 per cent of the potassium chlorid originally contained in the initial substance, 68 per cent of which consist of sylvinite. The salts which separate out, namely carnallite and sylvinite contain 7.8 per cent of potassium chlorid, and the brines 6.4 per cent thereof. 65 kilograms of the 125 kilograms of pure carnallite originally contained in the residue are thus converted into sylvinite. 30 kilograms of the said pure carnallite go into solution but are immediately recovered on cooling, whilst 30 kilograms remain in the residue undecomposed. The salts containing carnallite which have separated out are worked up for the recovery of potassium chlorid.

Thus a sylvinite containing 61 per cent of potassium chlorid together with a certain amount of pure carnallite is obtained with very little loss of potassium chlorid, from a crude carnallite containing 32 per cent of potassium chlorid. The decomposition is more rapid and the result even better, when a worm conveyor is employed.

*Example 6*

235 kilograms of steam are passed from above through 1 metric ton of pure artificial carnallite containing 5 per cent of moisture. 750 kilograms of hot solution are thus obtained, from which 170 kilograms of carnallite separate on cooling. The residue amounts to 385 kilograms and consists of 250 kilograms of carnallite and 135 kilograms of sylvinite, which is equivalent to a total content of 200 kilograms of potassium chlorid. Thus a sylvinitic carnallite is produced containing 52 per cent of potassium chlorid, that is to say 79 per cent of the potassium chlorid originally contained in the initial substance, are contained in the residue; 23 per cent thereof are contained in the carnallite which separate out and 1 per cent are contained in the brines. Thus about 68 per cent of the carnallite is decomposed, whilst magnesium chlorid solutions are formed and solid potassium chlorid is recovered.

If the residue amounting to 385 kilograms is further treated with moist steam (70 kilograms of water with 45 kilograms of steam) 330 kilograms of hot brine are obtained, from which 40 kilograms of salt, consisting of carnallite and sylvinite separate out. The residue amounts to 170 kilograms and consists of 85 per cent of sylvinite and 15 per cent of carnallite, that is to say, a carnallitic sylvinite containing 89 per cent of potassium chlorid. Reckoned on the initial substance it contains 61 per cent of the potassium chlorid originally contained therein, whilst the salts, which crystallize from the brines contain 10 per cent thereof and the brines 8 per cent of the said potassium chlorid.

*Example 7*

65 parts of crude nitrate earth containing 10.3 per cent of sodium nitrate are lixiviated in the aforedescribed manner in a system of eight containers arranged in series, each being heatable externally. 1.9 parts of solid pure sodium nitrate, 2.9 parts of sodium nitrate dissolved in 6.1 parts by volume of solution, and 1.2 parts of sodium nitrate dissolved in 5.9 parts of solution are obtained. Of the total sodium nitrate of the initial material are thus obtained 28.1 per cent as solid sodium nitrate, 43.0 per cent as concentrated and 18.5 per cent as less concentrated solution, that is altogether about 90 per cent.

*Example 8*

65 parts of crude caliche containing 5.9 per cent of sodium nitrate are treated in the aforedescribed manner in seven containers arranged in series, whereby 0.4 part of solid sodium nitrate and 2.6 parts of sodium nitrate in solution are obtained. Accordingly 77 per cent of the sodium nitrate contained in the initial material are thus recovered.

What we claim is:

1. The process of recovering valuable salts from a crude mineral salt, which comprises passing through said mineral salt steam and water.

2. The process of recovering valuable salts from a crude mineral salt, which comprises passing through said mineral salt steam and the mother liquor from a former charge.

3. The process of recovering valuable salts from a crude mineral salt, which comprises passing through said mineral salt steam and an aqueous liquid, and blowing air through the hot residue.

4. The process of recovering valuable salts from a crude mineral salt which comprises introducing water, which has a temperature of more than 100° C., from above into the lixiviating vessel, and by release of pressure therein partly converting it to steam.

5. The process of recovering valuable salts from a crude mineral salt, which comprises heating the said crude mineral salts to a tempreature higher than 100° C., and spraying an aqueous solvent onto the hot materials from above.

6. The process of recovering valuable salts from a crude mineral salt, which comprises treating a batch of said salt with steam and water, passing the resulting solution together with steam through other batches of said salt until the solution is substantially saturated with the dissolved salt, and always arranging the least lixiviated batch of crude salt at the end of the series.

7. The process of recovering sodium nitrate from crude nitrate earth, which comprises moistening the crude earth with an aqueous liquid, treating it with steam from above, removing the liquid with the aid of reduced pressure, separating the sodium nitrate from the salt solution, and employing the mother liquor for moistening a fresh charge.

8. The process of recovering sodium nitrate from crude nitrate earth, which comprises moistening the crude earth with an aqueous liquid, passing steam therethrough from above, separating the sodium nitrate from the salt solution, and employing the mother liquor for moistening a fresh charge.

9. The process of recovering sodium nitrate from caliche, which comprises passing steam and water through caliche, passing the resulting solution together with steam through other batches of caliche until the solution is substantially saturated with sodium nitrate and always arranging the least lixiviated batch of caliche at the end of the series.

10. The process of recovering sodium nitrate from caliche, which comprises heating caliche, thus recovering the iodine disengaged, then passing steam and water through the hot caliche, and passing the resulting solution together with steam through other batches of caliche until the solution is substantially saturated with sodium nitrate and always arranging the least lixiviated batch of caliche at the end of the series.

In testimony whereof we have hereunto set our hands.

ERNST JÄNECKE.
HERMANN KLIPPEL.
EMIL HEGELMANN.